US008972875B2

(12) United States Patent
Gossweiler, III et al.

(10) Patent No.: US 8,972,875 B2
(45) Date of Patent: Mar. 3, 2015

(54) RELEVANCE BAR FOR CONTENT LISTINGS

(75) Inventors: Richard Carl Gossweiler, III, Sunnyvale, CA (US); John Blackburn, Newcastle, WA (US); David A. Brown, Mountain View, CA (US); Neha Gupta, San Jose, CA (US); Manish Gordhan Patel, Mountain View, CA (US); Mehran Sahami, Palo Alto, CA (US); Thomas H. Taylor, Redmond, WA (US); Daniel John Zigmond, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 358 days.

(21) Appl. No.: 11/739,566

(22) Filed: Apr. 24, 2007

(65) Prior Publication Data
US 2008/0270395 A1    Oct. 30, 2008

(51) Int. Cl.
G06F 3/00       (2006.01)
G06F 17/30      (2006.01)
G06F 3/048      (2013.01)

(52) U.S. Cl.
CPC ................. *G06F 17/30017* (2013.01)
USPC ........... 715/764; 715/716; 715/719; 715/720; 715/730

(58) Field of Classification Search
USPC ................. 715/716, 719, 720, 723, 730, 764
See application file for complete search history.

(56) References Cited

U.S. PATENT DOCUMENTS

| | | | |
|---|---|---|---|
| 5,319,452 A | 6/1994 | Funahashi | |
| 5,550,576 A | 8/1996 | Klosterman | 348/6 |
| 5,623,613 A | 4/1997 | Rowe et al. | 395/353 |
| 5,793,888 A * | 8/1998 | Delanoy | 382/219 |
| 6,005,565 A | 12/1999 | Legall et al. | 345/327 |
| 6,025,837 A | 2/2000 | Matthews, III et al. | 345/327 |
| 6,034,677 A | 3/2000 | Noguchi et al. | 345/327 |
| 6,034,683 A * | 3/2000 | Mansour et al. | 715/764 |
| 6,064,062 A * | 5/2000 | Bohn | 250/237 R |
| 6,128,009 A | 10/2000 | Ohkura et al. | 345/327 |
| 6,177,931 B1 | 1/2001 | Alexander et al. | |
| 6,184,878 B1 | 2/2001 | Alonso et al. | 345/327 |
| 6,222,540 B1 * | 4/2001 | Sacerdoti | 345/581 |
| 6,240,555 B1 | 5/2001 | Shoff et al. | 725/110 |
| 6,275,229 B1 * | 8/2001 | Weiner et al. | 715/764 |

(Continued)

FOREIGN PATENT DOCUMENTS

| | | | | |
|---|---|---|---|---|
| EP | 1126701 A1 | 8/2001 | | H04N 5/445 |
| EP | 1387583 A1 | 2/2004 | | H04N 7/173 |

(Continued)

OTHER PUBLICATIONS

Microsoft Computer Dictionary, Fifth Edition, Microsoft Press, 2002, 3 pages.

(Continued)

*Primary Examiner* — Steven B Theriault

(74) *Attorney, Agent, or Firm* — Morgan, Lewis & Bockius LLP

(57) ABSTRACT

A client computer receives a set of search results ordered based on scheduled time of broadcast associated with respective listings of content. The listings of content include data representing time-bounded events. The client computer displays or otherwise presents a set of objects along an axis of a display bar, the objects corresponding to subsets of the search results. For example, the axis is associated with a unit of time or a unit of relevance.

24 Claims, 15 Drawing Sheets

(56) References Cited

U.S. PATENT DOCUMENTS

| | | | |
|---|---|---|---|
| 6,289,170 B1 | 9/2001 | Nagano et al. | |
| 6,301,579 B1* | 10/2001 | Becker | 1/1 |
| 6,357,043 B1 | 3/2002 | Ellis et al. | 725/61 |
| 6,499,138 B1 | 12/2002 | Swix et al. | 725/38 |
| 6,600,501 B1* | 7/2003 | Israel et al. | 715/810 |
| 6,690,391 B1 | 2/2004 | Proehl et al. | 345/720 |
| 6,707,454 B1* | 3/2004 | Barg et al. | 345/440 |
| 6,742,184 B1 | 5/2004 | Finseth et al. | 725/52 |
| 6,756,997 B1 | 6/2004 | Ward, III et al. | |
| 6,769,128 B1 | 7/2004 | Knee et al. | 725/43 |
| 6,839,705 B1 | 1/2005 | Grooters | 707/4 |
| 6,943,793 B2* | 9/2005 | Bowser et al. | 345/440.2 |
| 6,950,989 B2* | 9/2005 | Rosenzweig et al. | 715/721 |
| 6,983,478 B1 | 1/2006 | Grauch et al. | |
| 6,996,782 B2* | 2/2006 | Parker et al. | 715/764 |
| 7,013,478 B1 | 3/2006 | Hendricks et al. | |
| 7,079,142 B2* | 7/2006 | Chiu et al. | 345/440 |
| 7,188,156 B2* | 3/2007 | Bertram et al. | 709/219 |
| 7,325,198 B2* | 1/2008 | Adcock et al. | 715/722 |
| 7,373,652 B1 | 5/2008 | Bayrakeri et al. | 725/53 |
| 7,404,150 B2* | 7/2008 | Clark et al. | 715/810 |
| 7,421,421 B2* | 9/2008 | Newbold et al. | 1/1 |
| 7,454,777 B1 | 11/2008 | Nishikawa et al. | |
| 7,493,303 B2* | 2/2009 | Newbold et al. | 1/1 |
| 7,505,038 B2* | 3/2009 | Bell et al. | 345/440 |
| 7,552,459 B2 | 6/2009 | Klosterman et al. | 725/42 |
| 7,606,819 B2* | 10/2009 | Audet et al. | 1/1 |
| 7,694,236 B2* | 4/2010 | Gusmorino et al. | 715/838 |
| 7,698,657 B2* | 4/2010 | Gemmell et al. | 715/833 |
| 7,788,080 B2* | 8/2010 | Graham et al. | 703/21 |
| 7,788,592 B2* | 8/2010 | Williams et al. | 715/764 |
| 7,800,615 B2* | 9/2010 | MacPherson | 345/440 |
| 7,801,784 B2* | 9/2010 | Bandman et al. | 705/35 |
| 7,831,601 B2* | 11/2010 | Oral et al. | 707/741 |
| 7,835,543 B2* | 11/2010 | Yoshinaga et al. | 382/103 |
| 7,890,490 B1* | 2/2011 | Bovenschulte et al. | 707/708 |
| 7,937,309 B2* | 5/2011 | Bandman et al. | 705/35 |
| 7,944,445 B1* | 5/2011 | Schorr et al. | 345/440 |
| 8,010,579 B2* | 8/2011 | Metsatahti et al. | 707/805 |
| 8,019,155 B2* | 9/2011 | Hibino et al. | 382/168 |
| 8,078,603 B1* | 12/2011 | Chandratillake et al. | 707/706 |
| 2001/0011373 A1 | 8/2001 | Inoue | |
| 2002/0042916 A1 | 4/2002 | Mineyama | 725/39 |
| 2002/0044144 A1 | 4/2002 | Inoue | 345/204 |
| 2002/0052864 A1 | 5/2002 | Yamamoto | 707/1 |
| 2002/0067379 A1 | 6/2002 | Kenyon et al. | 345/838 |
| 2002/0073424 A1 | 6/2002 | Ward, III et al. | |
| 2002/0112237 A1 | 8/2002 | Kelts | 725/39 |
| 2002/0129368 A1 | 9/2002 | Schlack et al. | 725/46 |
| 2002/0129110 A1 | 9/2002 | Kitsukawa et al. | 725/110 |
| 2003/0033296 A1* | 2/2003 | Rothmuller et al. | 707/3 |
| 2003/0038831 A1* | 2/2003 | Engelfriet | 345/719 |
| 2003/0113040 A1 | 6/2003 | Nishiyama et al. | 382/305 |
| 2003/0118087 A1* | 6/2003 | Goldthwaite et al. | 375/219 |
| 2003/0120373 A1* | 6/2003 | Eames | 700/128 |
| 2003/0126600 A1 | 7/2003 | Heuvelman | 725/35 |
| 2003/0149988 A1 | 8/2003 | Ellis et al. | |
| 2004/0002987 A1 | 1/2004 | Clancy et al. | 707/101 |
| 2004/0004617 A1* | 1/2004 | Street et al. | 345/440 |
| 2004/0031058 A1 | 2/2004 | Reisman | 725/112 |
| 2004/0059996 A1* | 3/2004 | Fasciano | 715/500.1 |
| 2004/0095376 A1* | 5/2004 | Graham et al. | 345/716 |
| 2004/0125137 A1* | 7/2004 | Stata et al. | 345/764 |
| 2004/0154040 A1 | 8/2004 | Ellis | 725/58 |
| 2004/0255296 A1 | 12/2004 | Schmidt et al. | 718/100 |
| 2004/0267897 A1 | 12/2004 | Hill et al. | 709/217 |
| 2005/0057566 A1* | 3/2005 | Githens et al. | 345/440 |
| 2005/0071323 A1 | 3/2005 | Gabriel et al. | |
| 2005/0076092 A1 | 4/2005 | Chang et al. | 709/217 |
| 2005/0076361 A1 | 4/2005 | Choi et al. | 725/45 |
| 2005/0086207 A1* | 4/2005 | Heuer et al. | 707/3 |
| 2005/0091596 A1* | 4/2005 | Anthony et al. | 715/712 |
| 2005/0102634 A1 | 5/2005 | Sloo | 715/823 |
| 2005/0108253 A1* | 5/2005 | Metsatahti et al. | 707/100 |
| 2005/0134945 A1* | 6/2005 | Gallagher | 358/527 |
| 2005/0144190 A1* | 6/2005 | Wada | 707/102 |
| 2005/0172315 A1 | 8/2005 | Chen | 725/39 |
| 2005/0210145 A1 | 9/2005 | Kim et al. | 709/231 |
| 2005/0228735 A1* | 10/2005 | Duquette | 705/37 |
| 2005/0235321 A1 | 10/2005 | Ahmad-Taylor | 725/56 |
| 2005/0273833 A1 | 12/2005 | Soinio | 725/113 |
| 2005/0278737 A1 | 12/2005 | Ma et al. | 725/40 |
| 2005/0278741 A1 | 12/2005 | Robarts et al. | 725/46 |
| 2005/0289142 A1* | 12/2005 | Adams | 707/6 |
| 2006/0020962 A1* | 1/2006 | Stark et al. | 725/32 |
| 2006/0031199 A1* | 2/2006 | Newbold et al. | 707/3 |
| 2006/0036639 A1* | 2/2006 | Bauerle et al. | 707/102 |
| 2006/0064716 A1 | 3/2006 | Sull et al. | 725/37 |
| 2006/0146436 A1 | 7/2006 | Goodwin et al. | 360/69 |
| 2006/0155757 A1* | 7/2006 | Williams et al. | 707/103 R |
| 2006/0156237 A1* | 7/2006 | Williams et al. | 715/720 |
| 2006/0156246 A1* | 7/2006 | Williams et al. | 715/764 |
| 2006/0173824 A1* | 8/2006 | Bensky et al. | 707/3 |
| 2006/0174269 A1 | 8/2006 | Hansen-Turton | |
| 2006/0195428 A1 | 8/2006 | Peckover | |
| 2006/0253869 A1 | 11/2006 | Boyer et al. | 725/51 |
| 2007/0005563 A1 | 1/2007 | Aravamudan et al. | 707/2 |
| 2007/0033169 A1* | 2/2007 | Friedman | 707/3 |
| 2007/0073894 A1 | 3/2007 | Erickson et al. | 709/230 |
| 2007/0083522 A1 | 4/2007 | Nord et al. | 707/10 |
| 2007/0106693 A1 | 5/2007 | Houh et al. | |
| 2007/0107019 A1 | 5/2007 | Romano et al. | 725/80 |
| 2007/0112578 A1 | 5/2007 | Randle et al. | 705/1 |
| 2007/0118852 A1 | 5/2007 | Calderwood | 725/38 |
| 2007/0157222 A1 | 7/2007 | Cordray et al. | 725/13 |
| 2007/0157232 A1 | 7/2007 | Dunton et al. | |
| 2007/0250855 A1* | 10/2007 | Quinn-Jacobs et al. | 725/35 |
| 2008/0022310 A1 | 1/2008 | Poling et al. | |
| 2008/0082578 A1* | 4/2008 | Hogue et al. | 707/104.1 |
| 2008/0086688 A1* | 4/2008 | Chandratillake et al. | 715/719 |
| 2008/0104058 A1 | 5/2008 | Billmaier et al. | 707/5 |
| 2008/0104529 A1* | 5/2008 | Cravens et al. | 715/764 |
| 2008/0201740 A1 | 8/2008 | Boyer et al. | 725/39 |
| 2008/0240560 A1* | 10/2008 | Hibino et al. | 382/168 |
| 2008/0270449 A1 | 10/2008 | Gossweiler et al. | 707/102 |
| 2008/0282291 A1 | 11/2008 | Henty | 725/44 |
| 2009/0033664 A1* | 2/2009 | Hao et al. | 345/440 |
| 2010/0031193 A1* | 2/2010 | Stark et al. | 715/810 |
| 2010/0121714 A1 | 5/2010 | Bovenschulte et al. | |
| 2010/0135643 A1* | 6/2010 | Fleming | 386/117 |
| 2010/0257561 A1 | 10/2010 | Maissel et al. | |

FOREIGN PATENT DOCUMENTS

| | | | | |
|---|---|---|---|---|
| JP | 2003-032568 | | 1/2003 | |
| WO | WO 2005/101842 A1 | | 10/2005 | H04N 7/173 |

OTHER PUBLICATIONS

International Search Report and Written Opinion, PCT/US2007/088246, Apr. 3, 2008, 9 pages.

International Search Report and Written Opinion, PCT/US2008/061307, Sep. 4, 2008, 9 pages.

Google Inc., Office Action, Chinese Patent Application 200780051900.7, Mar. 20, 2012, 4 pgs.

Google Inc., Office Action, CN 200780051900.7, Oct. 23, 2012, 5 pgs.

Google Inc., Office Action, CN 200780051900.7, Mar. 24, 2011, 6 pgs.

Google, Office Action, Japanese Patent Application 2009-544203, Aug. 22, 2012, 3 pgs.

Google Inc., Communication pursuant to Article 94(3) EPC, EP 07865892.9, Oct. 14, 2009, 4 pgs.

* cited by examiner

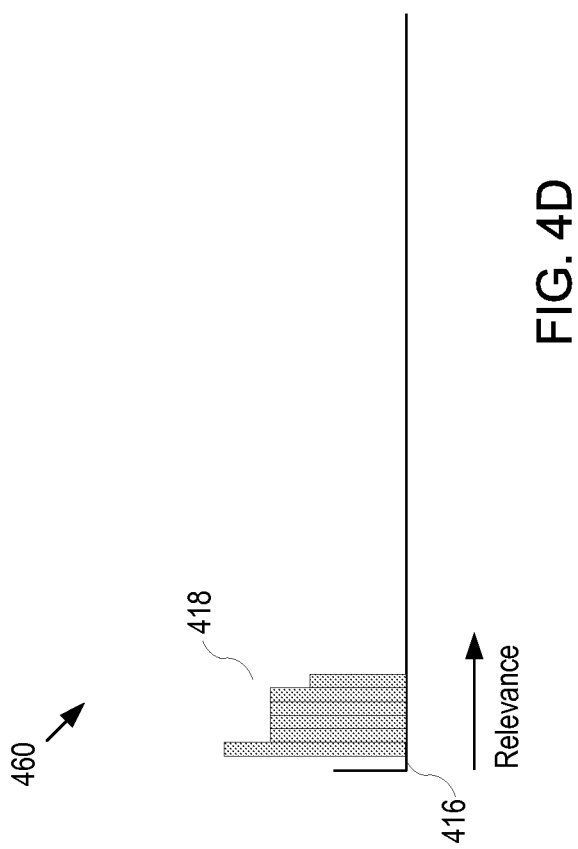

US 8,972,875 B2

RELEVANCE BAR FOR CONTENT LISTINGS

CROSS REFERENCE TO RELATED APPLICATIONS

This application is related to patent application Ser. No. 11/7239,557, entitled "Virtual Channels," filed on Apr. 24, 2007.

TECHNICAL FIELD

The disclosed embodiments relate generally to the presentation of scheduling information for multimedia events, and more specifically to aspects of creating virtual channels based on selected search results related to the scheduling information for multimedia events.

BACKGROUND

Currently, multimedia events, such as television shows, are organized by channels. The major television networks dictate which show is to be broadcast at a particular time for a respective channel. Thus, a user must tune-in to a show of the user's choosing at the time of broadcast as dictated by the respective television network. If the user wishes to view all the scheduling information for a particular show, or for a set of shows selected by the user, the user must search through the channels provided by the television networks for all the showings or episodes of the show or shows that are of interest to the user.

BRIEF DESCRIPTION OF THE DRAWINGS

FIGS. 4A, 4B, 4C and 4D illustrate a relevance bar, according to certain embodiments of the invention.

DESCRIPTION OF EMBODIMENTS

Figure 1:
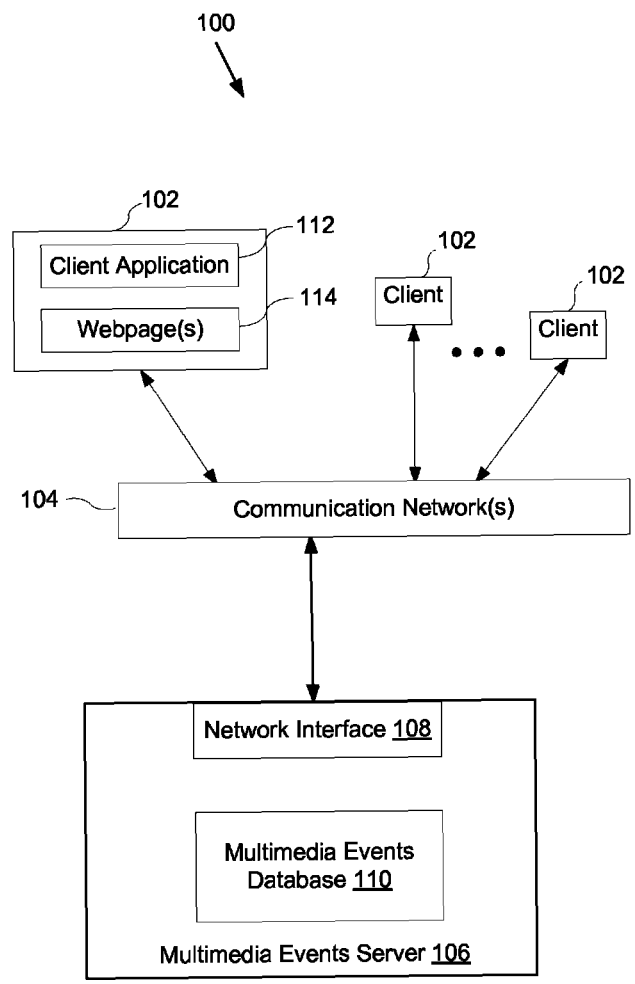
FIG. 1 is a block diagram illustrating an exemplary distributed computer system, according to certain embodiments of the invention.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments of the invention, a computing system provides listings of multimedia events, including scheduled time of broadcast to a user. Non-limiting examples of multimedia events include television shows, radio shows, video shows, sporting events and motion pictures (e.g., sporting events and motion pictures that are broadcast by TV, cable, satellite, video-on-demand, etc.). Multimedia events may include user created content, and/or content produced or created by content broadcasting and publishing companies, and/or content from a variety of other content providers. Other examples of multimedia events include events referenced by metadata site summaries, and multimedia messaging services. Examples of multimedia events referenced by metadata site summaries are podcasts, ESPN real time sports feeds, etc. Metadata site summaries provide information such as summaries of a multimedia show, original airtime, re-broadcast airtime, genre, show ratings, actor lists, images of actors, links to the referenced multimedia show, links to one or more trailers of the referenced multimedia show, etc. Multimedia messaging services provide information such as title, description, authorship, airtime, links to the referenced multimedia show, links to one or more trailers of the referenced multimedia show, etc.

For example, the user can specify a headend (name of content provider) and/or a zip code (or other geographic location identifier) and enter one or more search strings. In response, the system performs a search, using the entered search strings, on the listings of multimedia events corresponding to the specified headend and/or zip code. According to one feature of certain embodiments, the search results are presented to the user as an ordered list based on the scheduled time of broadcast. The user, if so desired, can select all or some of the listings to create a virtual channel of the selected listings.

FIG. 1 is a block diagram illustrating an exemplary distributed computer system 100, according to certain embodiments of the invention. In FIG. 1, system 100 may include one or more client computers 102, communication network(s) 104 and a multimedia events server 106. Client computers 102 can be any of a number of computing devices (e.g., Internet kiosk, personal digital assistant, cell phone, gaming device, desktop computer, laptop computer, handheld computer, or combinations thereof) used to enable the activities described below. Client computer(s) 102 is also referred to herein as client(s) or client device(s). Client 102 includes webpage(s) 114 and a client application 112 that permits the user to view web pages 114 or other documents of information. Further, client application 112 may permit the user to interact with client 102 and/or network resources to perform one or more tasks. For example, client application 112 may be a web browser (e.g., Firefox, Internet Explorer, etc.) or other type of application that permits the user to search for, browse, and/or use resources, such as web pages 114, on client 102 and/or accessible via communication network 104. One embodiment of client 102 is described in greater detail herein with reference to FIG. 5. Client 102 is connected to multimedia events server 106 via communication network(s) 104. Multimedia events server 106 includes a network interface 108 and a multimedia events database 110. In some embodiments, multimedia events server 106 is an Internet server. Alternatively, if multimedia events server 106 is used within an intranet, it may be an intranet server. In some embodiments, fewer and/or additional modules, functions or databases are included in multimedia events server 106. One embodiment of multimedia events server 106 is described in greater detail herein with reference to FIG. 6.

The communication network 104 may be the Internet, but may also be any local area network (LAN), a metropolitan area network, a wide area network (WAN), such as an intranet, an extranet, or the Internet, or any combination of such networks. It is sufficient that the communication network 104 provides communication capability between the clients 102 and the multimedia events server 106. In some embodiments, the communication network 104 uses HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any document, object, information item, set of information, or service that is accessible via a Uniform Resource Locator (URL) and can be, for example, a web page, a text or word processing document, an email message, a transcribed voice message, a database, an image, a computational object, or other type of file.

Network interface 108 facilitates communication between multimedia events server 106 and communication network 104. Network interface 108 allows for the transfer of information from multimedia events server 106 to the communication network 104 to be presented by client application 112 of client 102. Multimedia events database 110 stores information on multimedia events.

Notwithstanding the discrete blocks in FIG. 1, the figure is intended to be a functional description of some embodiments of the invention rather than a structural description of functional elements in the embodiments. One of ordinary skill in the art will recognize that an actual implementation might have the functional elements grouped or split among various components. Moreover, one or more of the blocks in FIG. 1 may be implemented on one or more servers designed to provide the described functionality. Although the description herein refers to certain features implemented in client 102 and certain features implemented in multimedia events server 106, the embodiments of the invention are not limited to such distinctions. For example, features described herein as being part of multimedia events server 106 could be implemented in whole or in part in client 102, and vice versa.

Figure 2:
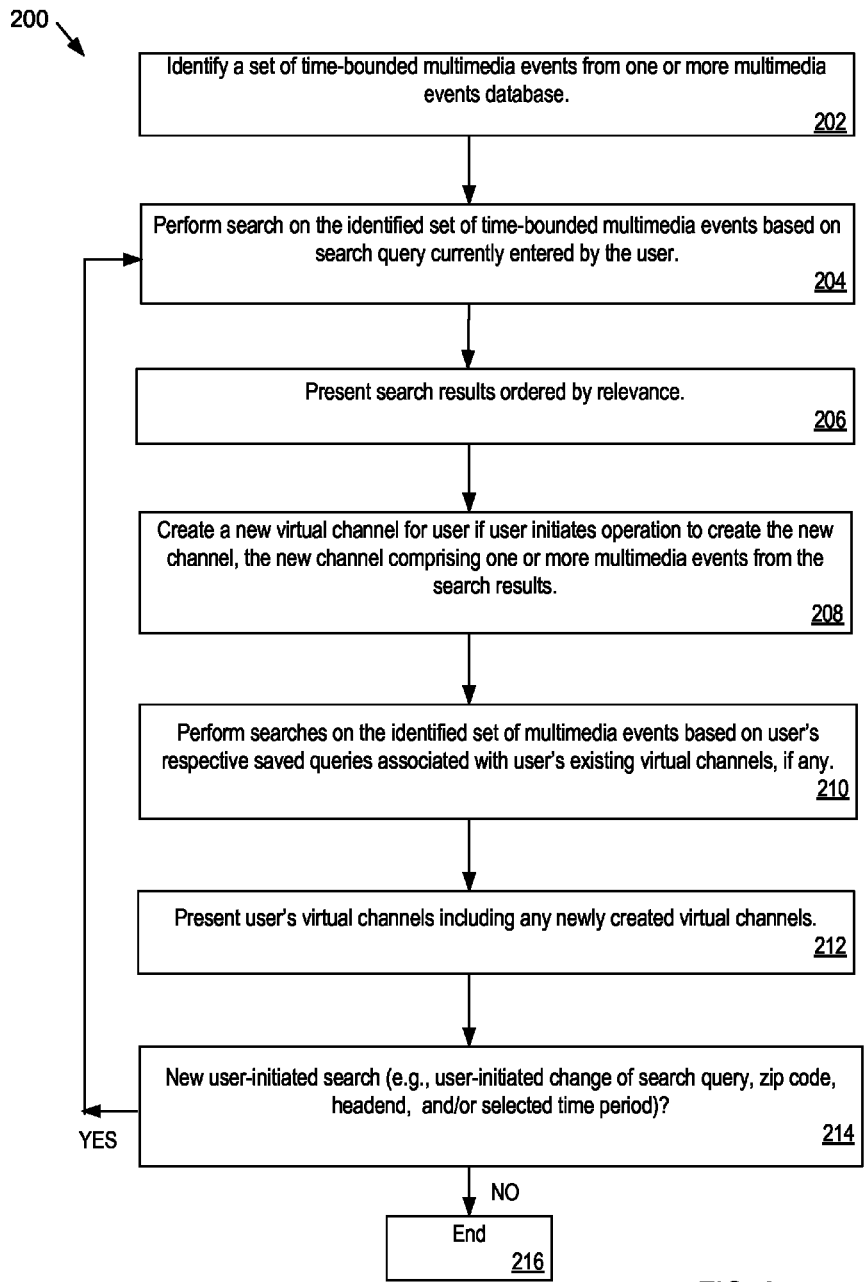
FIG. 2 is a high-level flowchart of a process for creating virtual channels, according to certain embodiments of the invention.

FIG. 2 is a high-level flowchart of a process 200 for creating virtual channels, according to certain embodiments. Process 200 may comprise operations that occur simultaneously. For purposes of explanation, assume that a user initiates a search for multimedia events by entering a search query using client application 112 of client 102. The user may specify a headend, zip code and/or a time period within which the scheduled broadcast of the multimedia content is to occur. A set of time-bounded multimedia events from one or more multimedia events databases is identified based on the specified headend, zip code and/or time period (202). If the search query does not specify a headend, a set of time-bounded multimedia events may be identified based on: one or more headends associated with the zip code specified by the user, a zip code previously used by the user or a zip code associated with the user's account; a randomly selected headend, all headends, or a majority of headends. Similarly, if the search query does not specify a zip code (or other geographic designation), a set of time-bounded multimedia events may be identified based on: a zip code previously provided by the user, a zip code that is associated with the user's account, or a randomly selected zip code. In addition, if the search query does not specify a time period, a set of time-bounded multimedia events may be identified based on a pre-selected default value for the time period (e.g., the time period between "now" and the period ending 7 days from now).

A search is performed on the identified set of time-bounded multimedia events based on the search query currently entered by the user (204). The search results are presented to the user ordered by relevance, according to certain embodiments (206). For example, the search results may be presented as a list. Alternately, or in addition, the search results may be presented on a relevance bar, as described in greater detail herein with reference to FIGS. 3A-3E, and FIGS. 4A-4D, respectively. A new virtual channel is created for the user if the user initiates an operation to create a new channel based on time-bounded multimedia events selected by the user from the search results (208). Further, searches are performed on the identified set of time-bounded multimedia events based on the user's respective saved queries associated with the user's existing virtual channels, if any (210). In other words, the user may have previously created one or more virtual channels. The information associated with the virtual channels are updated by performing searches on the identified set of time-bounded multimedia events using the saved queries associated with the virtual channels. It may be necessary to identify other sets of time-bounded multimedia events from the multimedia events database before performing searches based on the user's respective saved queries associated with the user's existing virtual channels. For example, a new set of time-bounded multimedia events is identified for a given saved query of the user if the associated headend, and/or zip code, and/or time period is different than that which is currently specified by the user as described with reference to (202). The user's virtual channels including the newly created virtual channel are presented to the user (212). The virtual channels presented to the user correspond to a user selected day and time of scheduled broadcast for the multimedia events. The user may select the day and time using GUI selector as described in greater detail herein with reference to FIGS. 4A-4C. If the user wishes to view virtual channel information corresponding to a new time period, such channel information is retrieved and presented to the user. If the user initiates a new search query (214), a new search is performed (204). If along with the new search query, the user initiates changes to the headend, and/or zip code, it may be necessary to identify additional sets of time-bounded multimedia events (202) before performing the new search. Process 200 ends if the user does not initiate any changes or a new search (216).

Figure 3A:
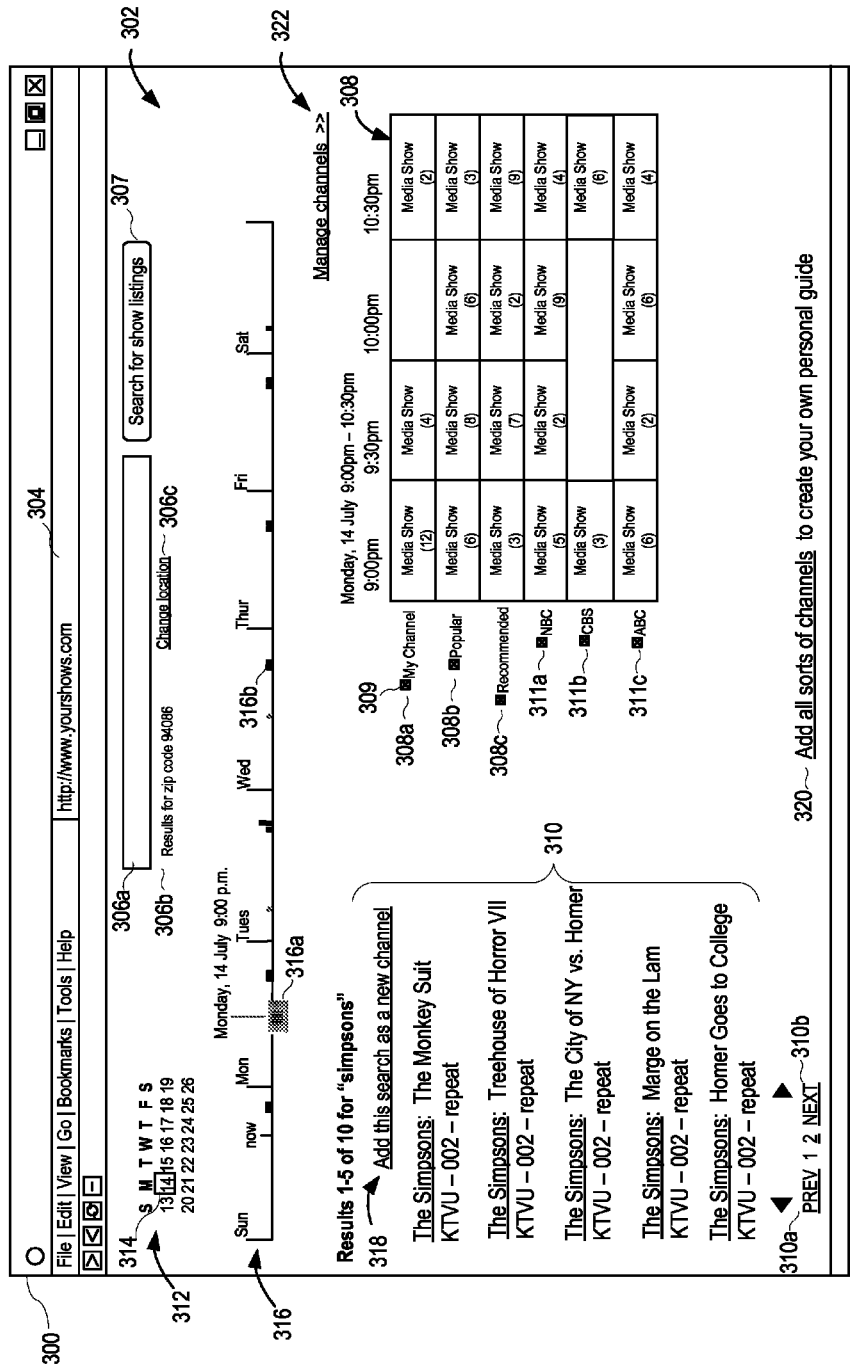
FIGS. 3A, 3B, 3C and 3D, each illustrates a schematic screenshot of a web browser presenting a web page that displays information on virtual channels, according to certain embodiments of the invention.

FIG. 3A is a schematic screenshot of the graphical user interface (GUI) 300 of a web browser, presenting a web page 302 that displays information on virtual channels, according to certain embodiments of the invention. Web page 302 may also be referred to as a channel search page. Web browser can be any type of browser that enables a user to display and interact with web pages or other documents or information. The GUI 300 of web browser includes a URL field 304 for entering the URL of any web page that a user wishes to display, as well as for displaying the URL of the web page currently being displayed. As illustrated in this figure, the web browser's GUI 300 displays an exemplary web page 302. Web page 302 comprises a search field 306a with: 1) a corresponding search button 307 for initiating a search for information corresponding to the search query entered in the search field 306a, 2) a zip code indicator 306b for showing the zip code for which the search is performed, and 3) a "change location" link 306c for enabling the user to specify a different zip code for performing the search. According to some embodiments, "change location" link 306c may also allow a user to specify a headend in addition to specifying the zip code. As an example and for purposes of explanation, the user may specify zip code 94086 using link 306c, and may enter the search query, "Simpsons," in search field 306a.

Web page 302 further comprises broadcast schedule 308 for the user's existing virtual channels, a results panel 310, a calendar 312, and a relevance bar 316. Continuing with the above example, assume that the search for scheduled multimedia events using search query "Simpsons" produces search results as illustrated in results panel 310. Results panel 310 shows a subset of the results of the search query. The user can see more results by selecting the NEXT button 310b. The user can return to the previous results by selecting the PREV button 310a. The search results may be displayed in a different manner, according to certain embodiments. For example, relevance bar 316 displays the days of the week and displays the set of search results as rectangular bars 316b on the relevance bar, according to certain embodiments. According to certain embodiments, relevance bar 316 includes a slider 316a for selecting a date for which the events are shown in broadcast schedule 308. The relevance bar is described in greater detail herein in reference to FIGS. 4A, 4B, 4C and 4D.

The broadcast schedule 308 for the user's existing virtual channels may be a grid representing scheduled multimedia events being broadcast on a particular day. According to certain embodiments, the search queries corresponding to the user's existing virtual channels are re-executed in order to identify the relevant time-bounded multimedia events for rendering on broadcast schedule 308. As illustrated in FIG. 3A, broadcast schedule 308 for the user's existing virtual channels is a grid having rows for displaying multimedia events scheduled for broadcast on virtual channels 308a, 308b, 308c, and broadcast channels (from third party sources) 311a, 311b and 311c. The displayed virtual channels 308 may be conveniently deleted by clicking on the delete button 309 next to the virtual channel title. Further, the user can manage the user's current collection of virtual channels and broadcast channels (also herein called television channels) by selecting link 322. For example, the user may delete one or more of the user's virtual channels, rename the user's virtual channels, and/or rearrange the order of appearance of the virtual channels and broadcast channels. For example, the virtual channels (or the virtual channels and broadcast channels) can be arranged alphabetically, in user specified order, based on genre, or based on relevance to a search query (e.g., channels are listed in accordance with a score based on the number and quality of matching results).

According to certain embodiments, the user may select one or more virtual channels from the user's current collection of virtual channels for publication using link 322. Published virtual channels are described in greater detail herein with reference to FIG. 3E. According to certain embodiments, the user may automate the recording of multimedia events in a given virtual channel using link 322. For example, relevant recording instructions may be sent to a recording device (e.g., a digital video recorder, or other storage device) associated with client 102.

In FIG. 3A, the information shown in broadcast schedule 308, results panel 310 and relevance bar 316 includes basic information (also referred to as "low resolution data") associated with the multimedia events. For example, the low resolution data associated with broadcast schedule 308 can include channel names and the number of shows or episodes scheduled for broadcast in a given time period (for a particular channel or virtual channel).

A calendar 312 displays a grid representing a range of dates. The date of the time-bounded multimedia events shown in broadcast schedule 308 is indicated by a highlighted date 314 in the calendar 312. The date of the events shown in broadcast schedule 308 for the user's existing virtual channels is indicated by a highlighted date 314 in the calendar 312. The date 314 may be highlighted by surrounding it with a box, as shown in FIG. 3A, or the text of the date may be displayed in a different color than the other dates, or the "whitespace" around the date may be a different color than the whitespace around the other dates in the calendar 312. In other embodiments, the calendar may also be represented in a different manner. For example, the calendar may be represented by a horizontal bar.

Figure 3B:
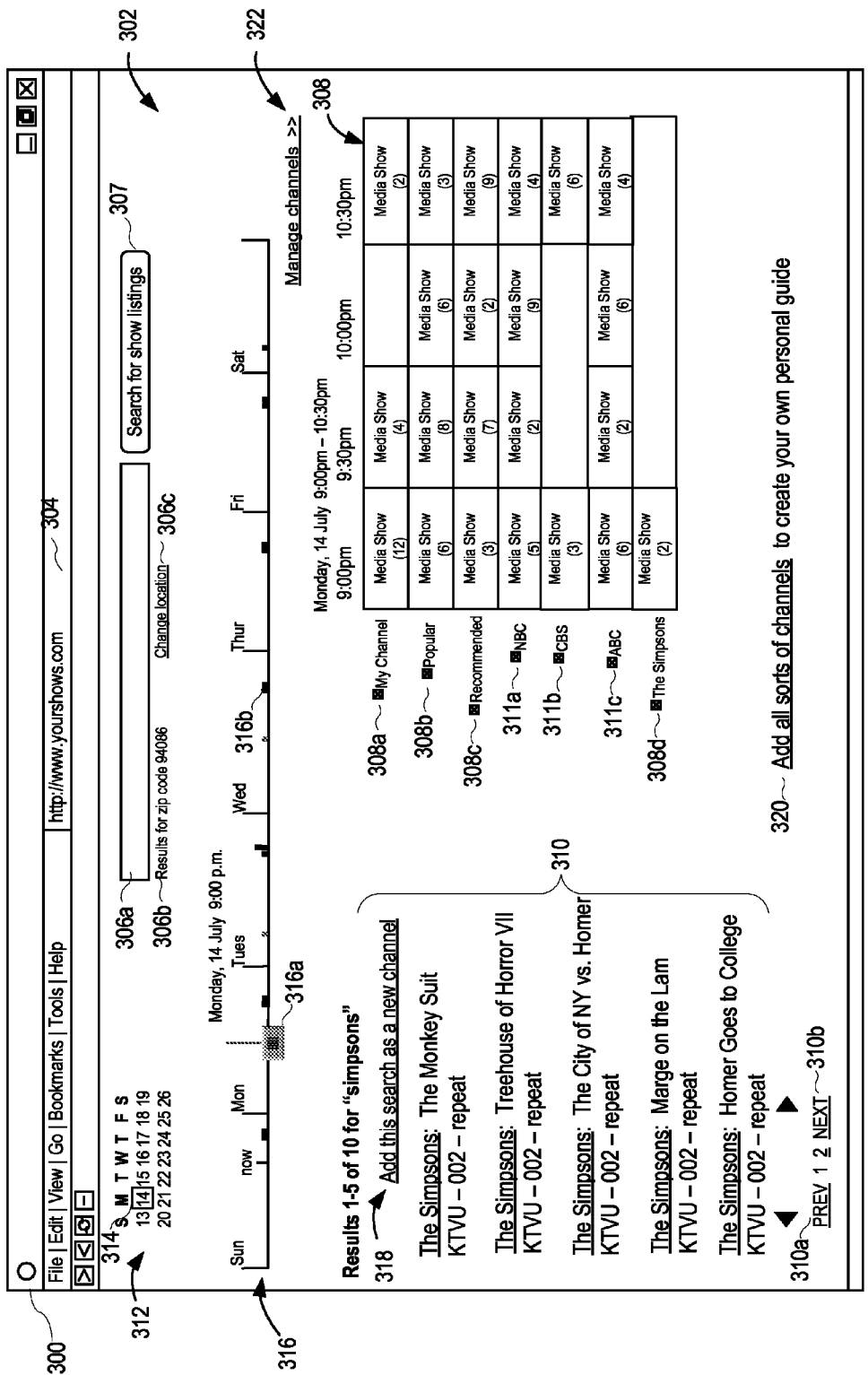

If the user wishes to add the current search results as a new virtual channel in the user's collection of virtual channels, the user may initiate such an action by selecting option 318 as shown in FIG. 3A. According to certain embodiments, the user may use a portion of the current search results by selecting multimedia events from the current search results for constructing a new virtual channel. The user may also provide a name for the newly created virtual channel, according to certain embodiments. For purposes of explanation, assume that the user adds the search results corresponding to the search query "Simpsons" as a new virtual channel to the user's collection of virtual channels. FIG. 3B shows that "The Simpsons" is added to broadcast schedule 308 as a new virtual channel 308d.

Figure 3C:
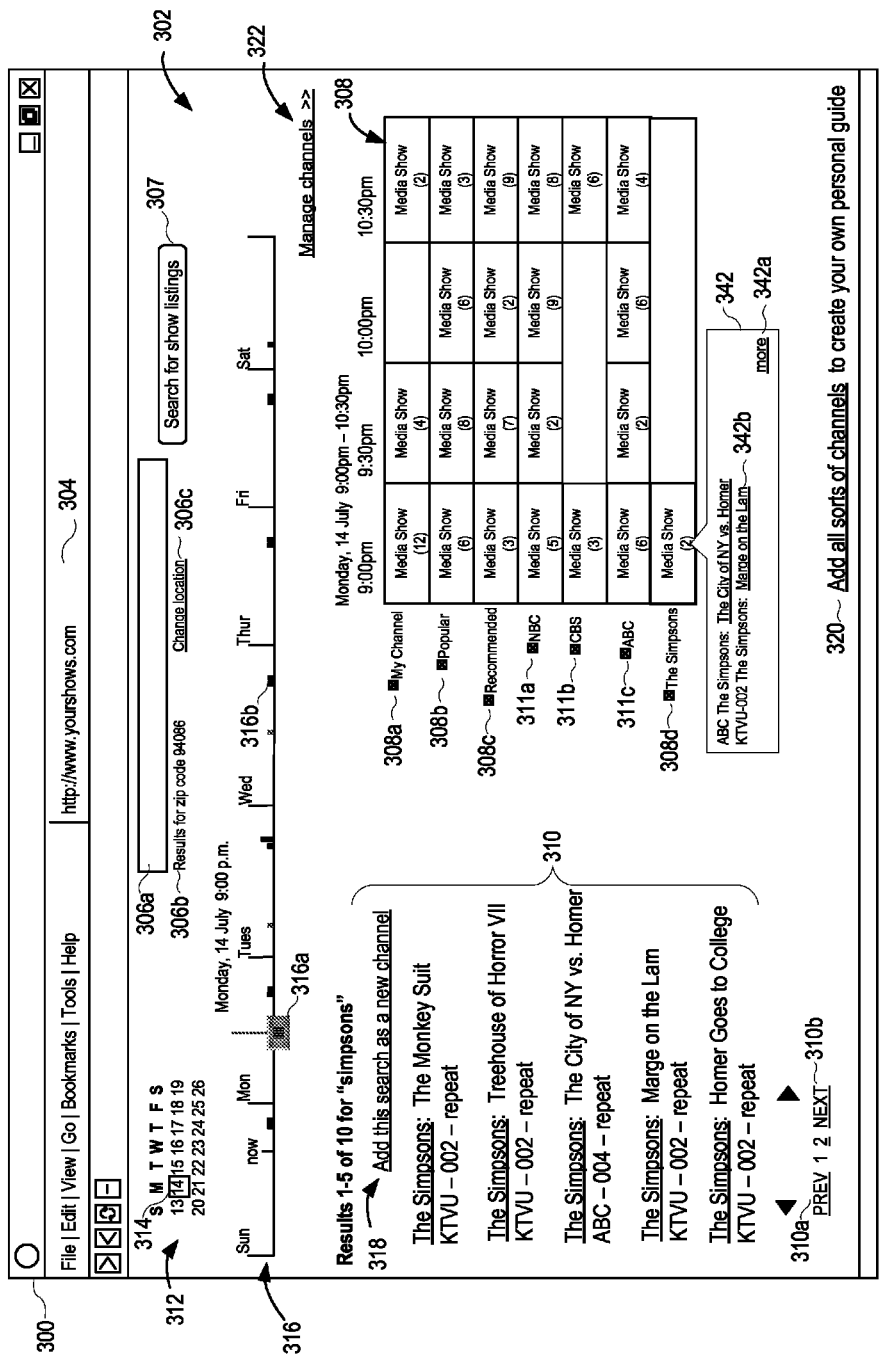

If more than one multimedia event is broadcast at the same time, broadcast schedule 308 indicates the number of multimedia events that are scheduled for broadcast in a given time slot, according to certain embodiments. For example, FIG. 3B shows that "The Simpsons" virtual channel 308d has two multimedia events that are scheduled for broadcast at 9:00 p.m. According to certain embodiments, the user may obtain additional information (e.g., show or episode names) on the multimedia events that are scheduled for broadcast in a given time slot by hovering the user's cursor over the time slot on broadcast schedule 308. Such additional information may be referred to as "medium resolution data." For example, FIG. 3C shows an iframe 342 that provides some medium resolution information (e.g., show names and episode names) on the multimedia events that are scheduled for broadcast in the time slot over which the user's cursor is hovering (cursor not shown in FIG. 3C). If, for example, the number of multimedia events is too numerous to be displayed all at once in iframe 342 (also called an inline frame), the user may obtain a longer list of the multimedia events by selecting the "more" option 342a as shown in FIG. 3C. According to certain embodiments, the user may obtain more detailed information on any one of the multimedia events displayed in iframe 342 by selecting a link 342b associated with the particular multimedia event as shown in FIG. 3C. In some embodiments, the iframe 342 is closed and the display of the information in the iframe ceases when the user closes the iframe 342 (e.g., by clicking on a close frame icon) or when the user clicks on the landing page or search results page that is partially obscured by the iframe.

Figure 3D:
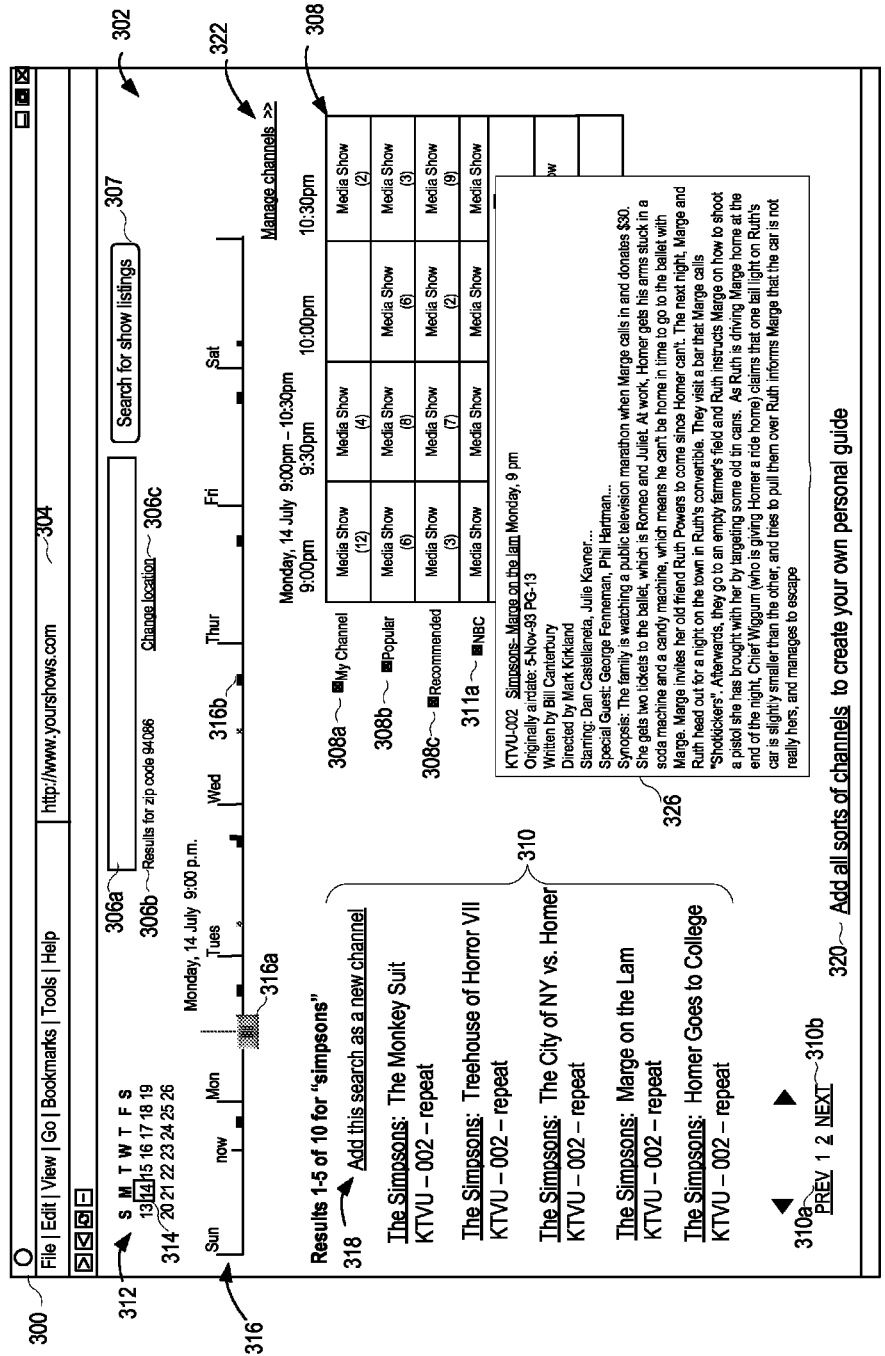

According to certain embodiments, when the user selects a link in results panel 310 or in an iframe on broadcast schedule 308, more detailed information (also referred to as "high resolution data") on the multimedia event is displayed. For example, FIG. 3D shows detailed information displayed in an iframe 326 when the user selects the link 342b (shown in FIG. 3C) associated with the particular multimedia event. For purposes of explanation, assume that the user wishes to obtain more information on the multimedia event, "KTVU-002 The Simpsons: *Marge on the Lam*" as shown in FIG. 3C and selects link 342a. According to certain embodiments, by selecting link 342b for "Marge on the Lam", the user is presented with more detailed information as shown in sample iframe 326 of FIG. 3D. As an example, the detailed information can include a description of the particular episode, information on the stars, director, writer, etc., associated with the multimedia event. A database structure for storing the low resolution data, medium resolution data and the high resolution data associated with multimedia events is described below with reference to FIG. 8, according to certain embodiments.

If the user wishes to add virtual channels that are published by other users/sources, the user can select link 320 (see bottom of FIG. 3C) to access a web page that publishes virtual channels, according to certain embodiments. Published virtual channels are described in greater detail herein with reference to FIG. 3E. According to certain embodiments, the user can create multimedia shows for broadcast. For example, the user may be associated with a media broadcast company. The user can create a multimedia show that is scheduled for broadcast at specific periods of time. For example, the user can create multimedia shows for broadcast through links provided in RSS feeds or through podcasts. Thus, such a user may choose to publish a channel comprising multimedia shows created by the user. As another example, the user may send information to a channel-publishing service. As an example, the user may use the Manage Channels feature, as previously described with reference to FIG. 3A, for publishing the user's virtual channels.

Figure 3E:
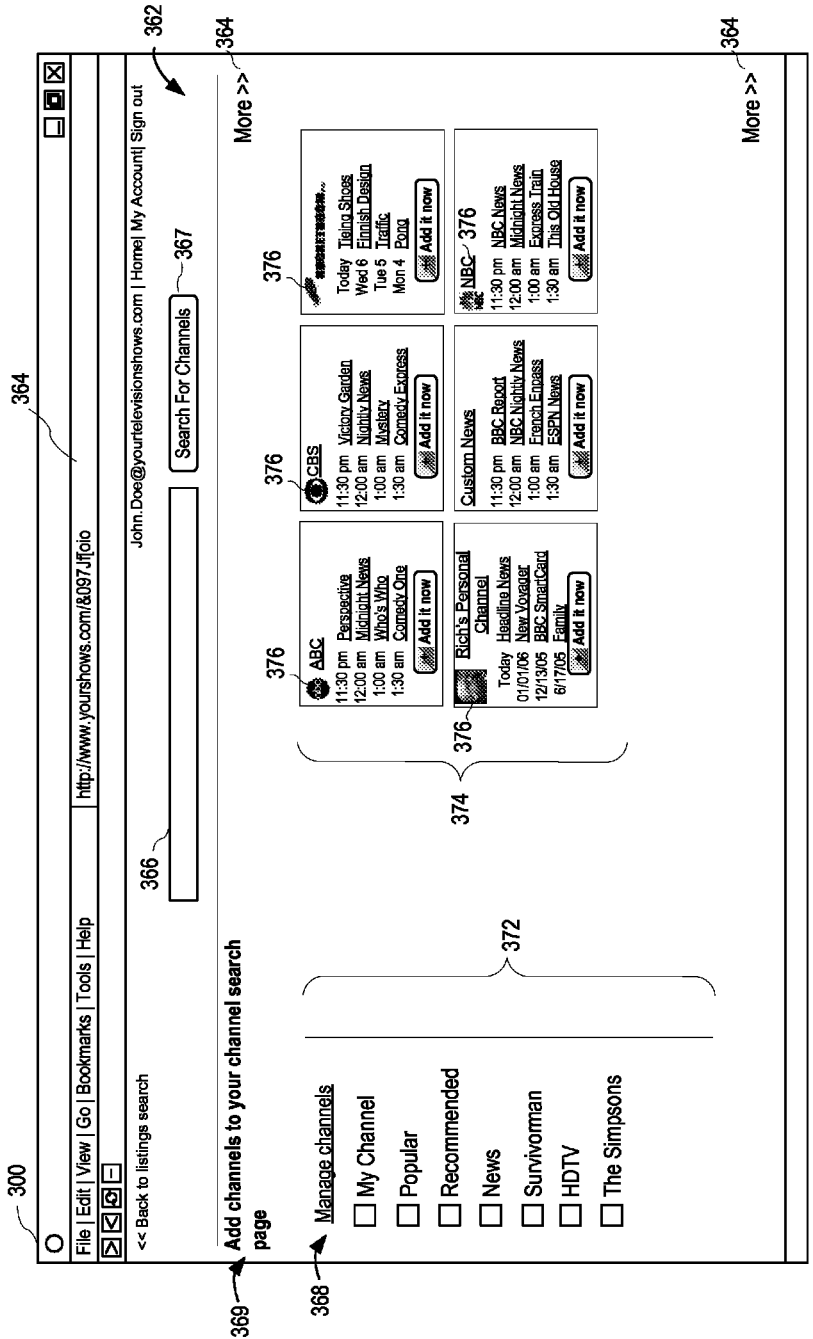
FIG. 3E is a schematic screenshot of a web browser presenting a web page that displays published virtual channels, according to certain embodiments of the invention.

In addition to enabling a user to create virtual channels as described above, the user is provided the option of adding virtual channels that have been created by other users/sources. FIG. 3E is a schematic screenshot of a web browser GUI 300 presenting a web page 362 that displays published virtual channels, according to certain embodiments of the invention. Web browser GUI 300 comprises a URL field 364 for entering the URL of any web page that a user wishes to display, as well as for displaying the URL of the web page currently being displayed. As illustrated in this figure, the web browser GUI 300 displays an exemplary web page 362 for enabling the user to view and/or select virtual channels that have been created by other users and/or sources as well as broadcast channels from third party sources. Web page 362 comprises a search field 366 with a corresponding search button 367 for initiating a search for virtual channels (or a search for virtual channels and broadcast channels) corresponding to the search query entered in the search field 366. Web page 362 further comprises a panel of published channels 374 from which the user may select, if so desired, one or more channels for adding to the user's collection of virtual channels. A published channel (which may be a virtual channel or a broadcast channel) may optionally be associated with an icon 376. More published channels, if any, may be displayed by selecting the "more" button 364. Web page 362 also shows the user's current collection 372 of virtual channels, and a "Manage Channel" action element 368 for enabling the user to manage the user's collection of virtual channels. The user can select a channel from panel 374 for adding to the user's collection of virtual channels by initiating an "add channel" action element such as the "Add channels to your channel search page" element 369. One embodiment of a channel search page is previously described herein with reference to FIG. 3A (see web page or channel search page 302 of FIG. 3A).

Figure 4A:
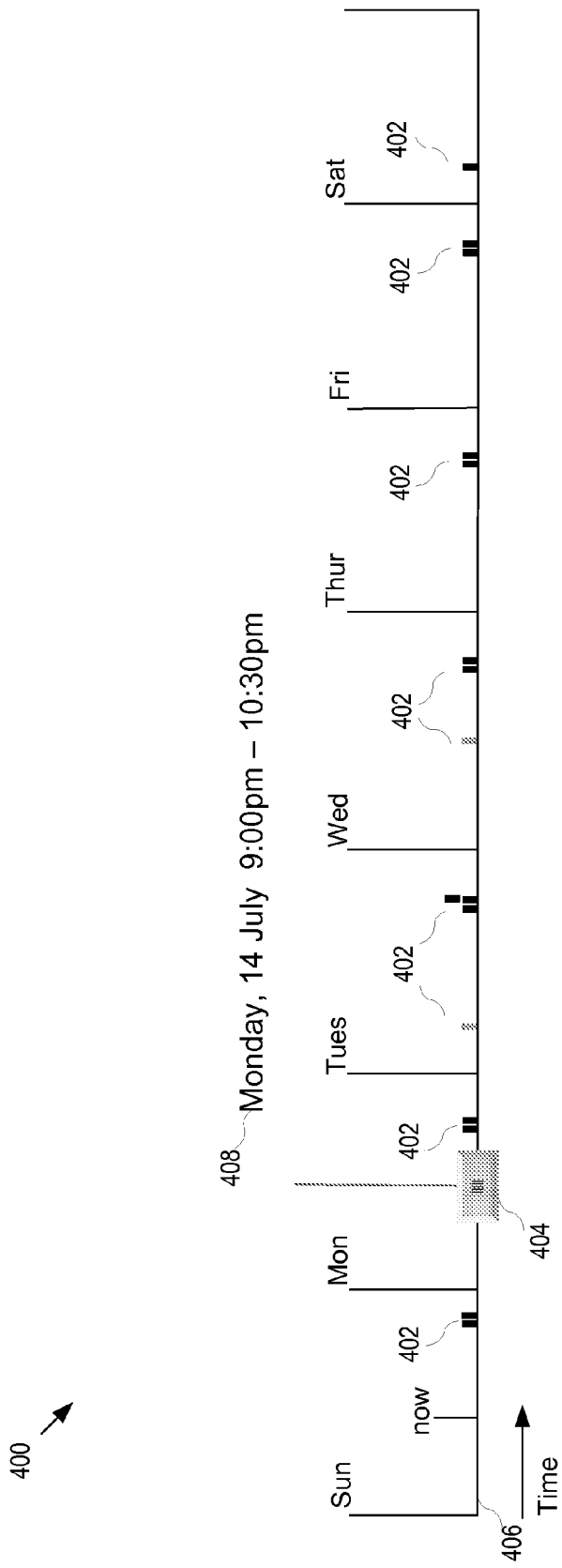

FIG. 4A illustrates a relevance bar 400, according to certain embodiments of the invention. As previously explained, when a user's enters a search query for multimedia events, the search results can be presented to the user as a list (e.g., results panel 310 of FIG. 3A) and/or presented on a relevance bar (e.g., relevance bar 316 of FIG. 3A). Such a relevance bar is described in greater detail with reference to FIG. 4A. Relevance bar 400 of FIG. 4A displays the days of the week along a horizontal axis 406 and displays the set of search results of multimedia events as objects 402, according to certain embodiments. As an example, objects 402 may be rectangular bars. The objects 402 may have display attributes, such as shape, color, size, etc., which indicate the relevance of the objects (i.e., the relevance of the scheduled multimedia events represented by the objects 402) to the search query.

According to certain embodiments, multiple time-bounded multimedia events that are associated with a similar date and time can be depicted, for example, as stacked rectangular bars as shown in FIG. 4A. As another non-limiting example, multiple time-bounded multimedia events that are associated with a similar date and time can be depicted as a rectangular bar that is relatively taller than other rectangular bars that represent a fewer number of time-bounded multimedia events. As yet another non-limiting example, multiple multimedia events may be depicted using an object of a shape that is different from one representing a single multimedia event. According to certain other embodiments, the vertical axis of the relevance bar may represent a measure of importance or relevance of a particular multimedia event. For example, the height of a rectangular bar may be proportional to the importance or relevance of the particular multimedia event that the rectangular bar represents. As another example, the physical attributes of the objects representing a respective multimedia event may be associated with varying levels of importance or relevance. For example, on object representing a multimedia event of relatively high importance may light-up, flash or blink to attract the user's attention. As yet another example, multimedia events that are related to the multimedia events of the search results are represented as objects of a shape and/or color that is different from ones representing multimedia events of the search results (i.e., multimedia events that match or satisfy a search query). Examples of related multimedia events include multimedia events that have content that is similar to the content of multimedia events from the search results.

According to certain embodiments, search results of multimedia events may be scored based on any combination of various factors such as the user's profile, results from a co-citation analysis, or anchor text analysis (e.g., analysis of text in or near links to the multimedia events) to determine related multimedia events. The user's profile may be based on user specified preferences. Alternately, the user's profile may be generated by the system based on the user's online behavior. As another example, a group profile may be used as the user's profile. A group profile is a general profile for a group of users of which the user is a member.

Further, relevance bar 400 may include a slider 404 that slides along the time axis. The position of the slider on the time axis is associated with a date and time 408. According to certain embodiments, when the user moves the slider to a new position along the time axis, the broadcast schedule 308 (see FIG. 3A, for example) is re-rendered to present new broadcast information corresponding to the date and time associated with the new position of the slider along the time axis of the relevance bar. Alternately, instead of slider 404, the relevance bar 400 may be responsive to the hovering of a mouse or other pointer over a portion of the relevance bar, and/or may be responsive to mouse clicks or other select signals on a user selected portion of the relevance bar.

Figure 4B:
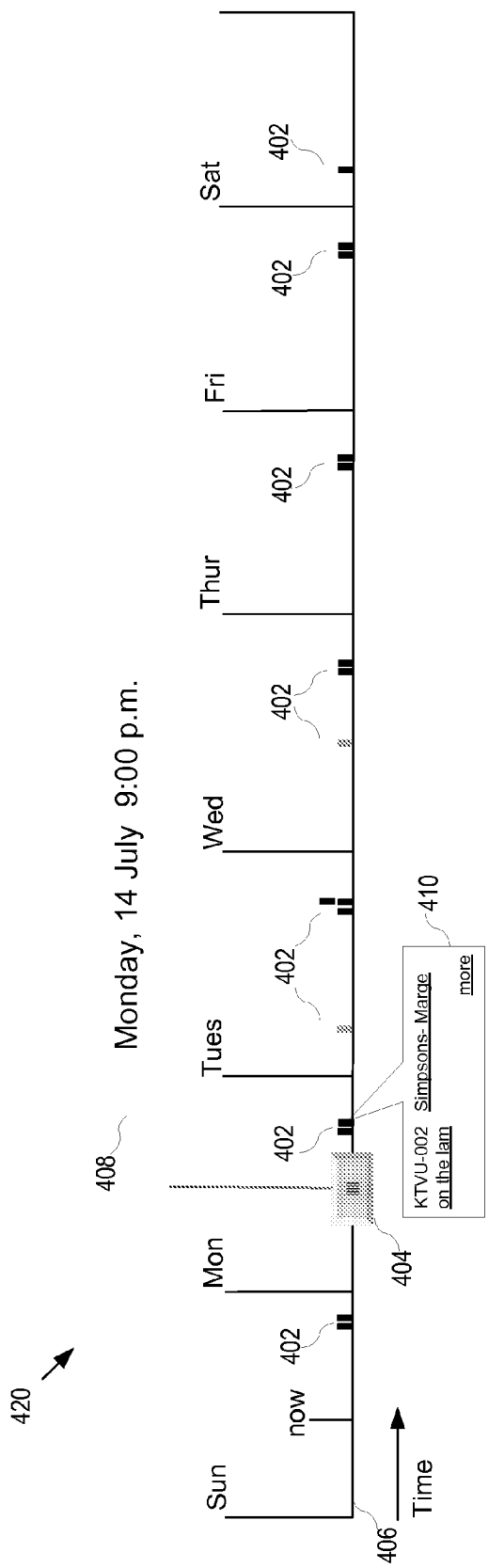
Figure 4C:
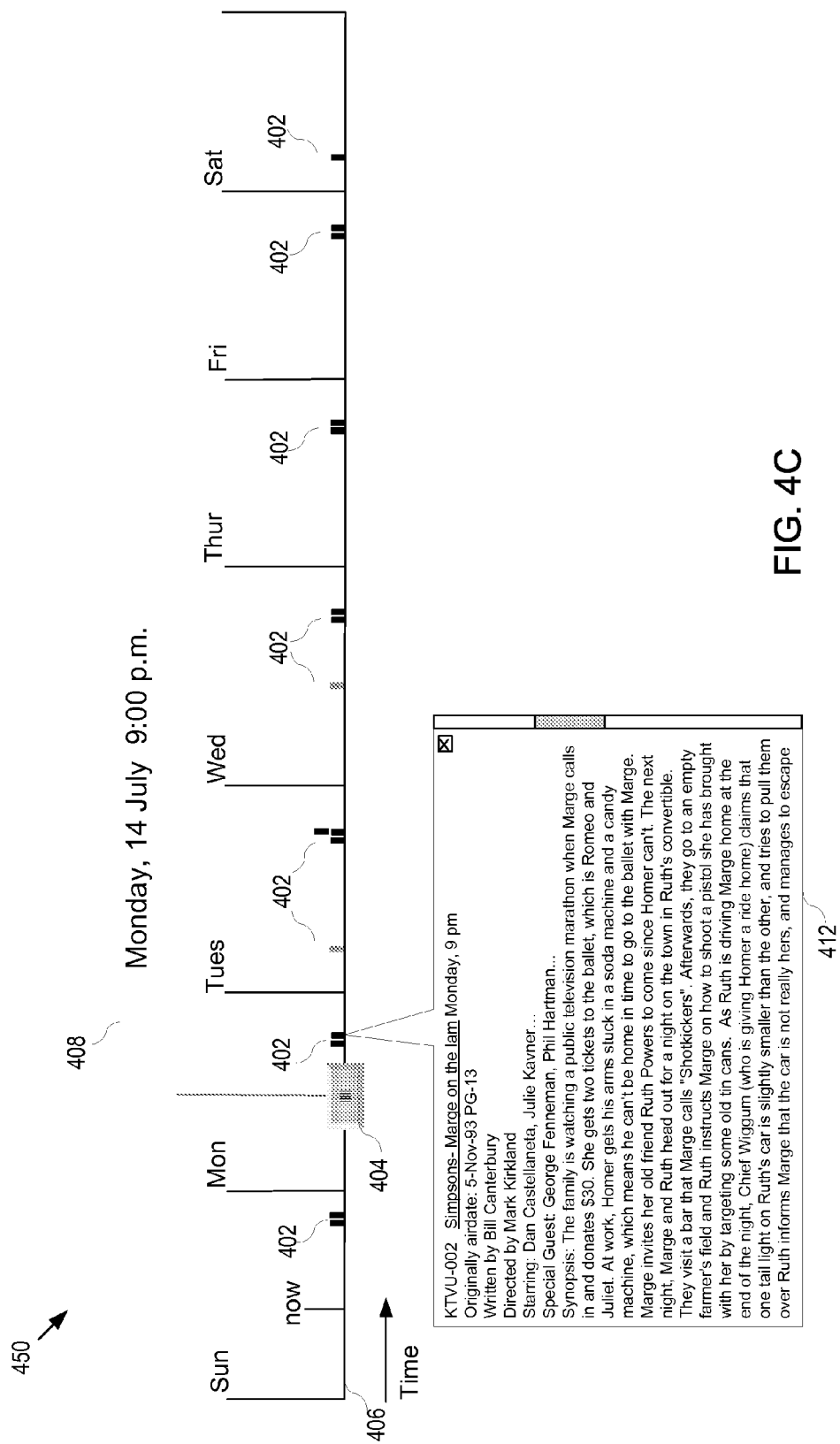

According to certain embodiments, when the user's mouse brushes over an object 402 (in the relevance bar 400) representing a respective multimedia event, an iframe 410 is presented to the user as shown on relevance bar 420 of FIG. 4B. According to certain embodiments, if the user selects a link (e.g., by clicking on the link) that is associated with a respective multimedia event in the iframe 410, the user is presented with another iframe that provides more detailed information on the selected multimedia event. For example, assume that the user clicks on the link for the TV show, "Simpsons—Marge on the lam" shown in iframe 410 as shown in FIG. 4B. As a result, iframe 412 on relevance bar 420 as shown in FIG. 4C is presented to the user. As a non-limiting example, iframe 412 shows detailed information on the TV show, "Simpsons—Marge on the lam" that is scheduled to broadcast at 9 p.m., Monday July 14.

According to some embodiments, the horizontal axis of the relevance bar may represent units of relevance. For example, FIG. 4D shows that the horizontal axis 416 of the relevance bar 460 represents units of relevance. The objects 418 on relevance bar 460 are ordered by relevance on the horizontal axis.

Figure 5:
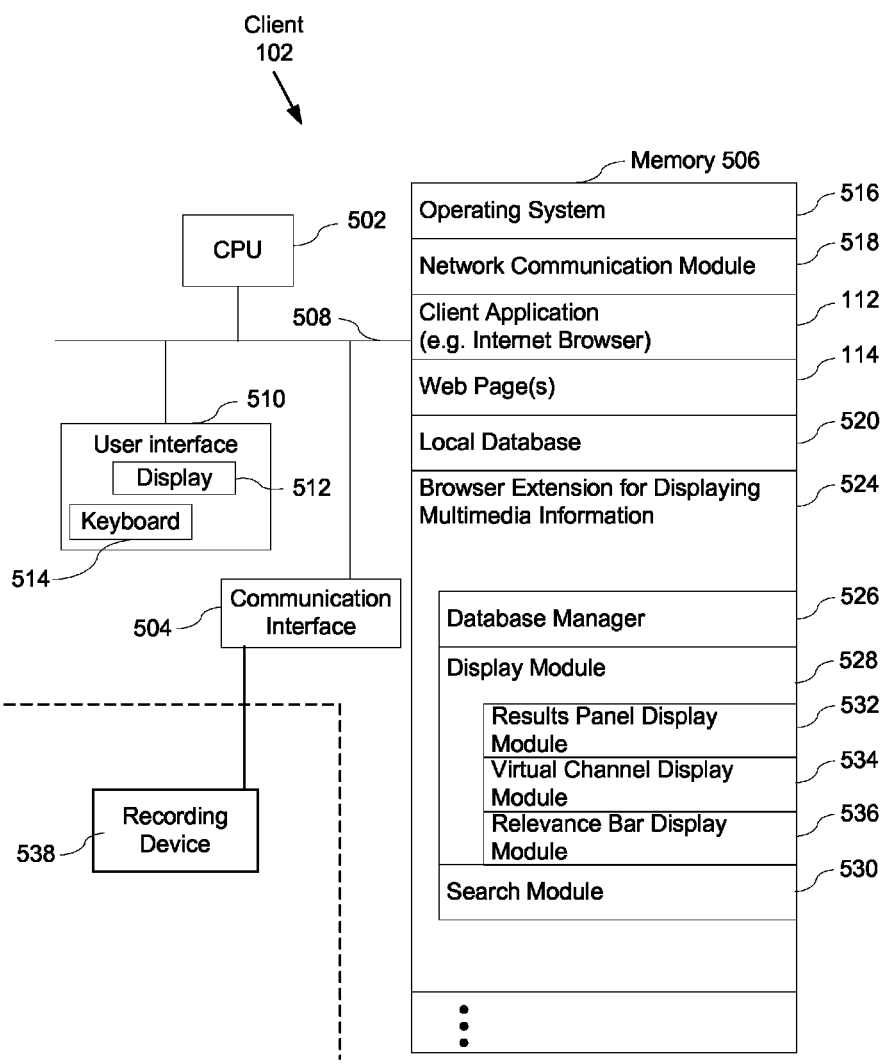
FIG. 5 is a block diagram illustrating a client, according to certain embodiments of the invention.

FIG. 5 is a block diagram illustrating client 102, according to certain embodiments of the invention. Client 102 includes one or more processing units (CPUs) 502, one or more network or other communication interfaces 504, memory 506, and one or more communication buses 508 for interconnecting these components. The communication buses 508 may include circuitry (sometimes called a chipset) that interconnects and controls communications between system components. Client 102 may include a user interface 510, for instance a display 512 and a keyboard 514. Memory 506 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. In some embodiments, memory 506 stores the following programs, modules and data structures, or a subset thereof:
- an operating system 516 that includes procedures for handling various basic system services and for performing hardware dependent tasks;
- a network communication module 518 that is used for connecting the client 102 to other computers or devices, such as recording device 538, via the one or more communication or network interfaces 504 and one or more communication networks, such as the Internet, other wide area networks, local area networks, metropolitan area networks, and so on;
- a client application 112 (e.g., a browser application) that permits a user to interact with the client 102 as described above;
- one or more web pages 114 that may be displayed by the client application 112;
- a local database 520 for storing information, such as multimedia information and virtual channel data; and
- a browser extension 524 for managing and displaying the information in the local database.

In some embodiments, browser extension 524 for displaying multimedia information includes a database manager 526, a display module 528 and a search module 530. Database manager 526 handles information stored on local database 520. Search module 530 is for conveying a search query entered by a user to a search engine or other online service, such as the server 106 described elsewhere in this document.

The display module 528 facilitates the display of multimedia information, as described above with reference to FIGS. 3A-3E, for example. In some embodiments, the display module includes a results panel display module 532, a virtual channel display module 534, and a relevance bar display module 536.

The virtual channel display module 534 determines how the virtual channels are displayed on the web page. The results panel display module 532 and the relevance bar display module 536 display the results of a search query associated with multimedia events.

Figure 6:
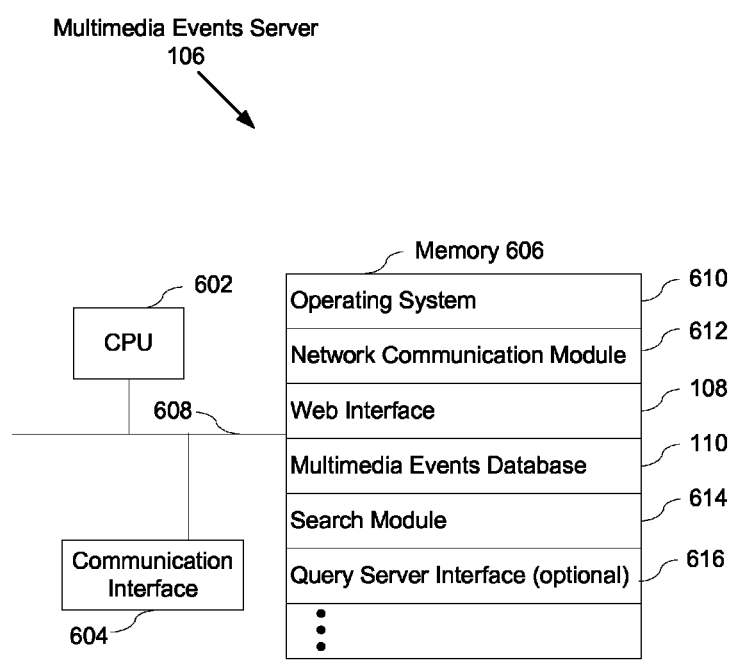
FIG. 6 is a block diagram of an exemplary server, according to certain embodiments of the invention.

FIG. 6 is a block diagram of an exemplary server 106 in accordance with some embodiments of the present invention. The server 106 typically includes one or more processing units (CPUs) 602, one or more network or other communication interfaces 604, memory 606, and one or more communication buses 608 for interconnecting these components. The communication buses 608 may include circuitry (sometimes called a chipset) that interconnects and controls communications between system components. The server 106 optionally may include a user interface (not shown). Memory 606 includes high-speed random access memory, such as DRAM, SRAM, DDR RAM or other random access solid state storage devices, and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. In some embodiments, memory 606 stores the following programs, modules, and data structures, or a subset thereof:
- an operating system 610 that includes procedures for handling various basic system services and for performing hardware dependent tasks;
- a network communication module 612 that is used for connecting the server 106 to other computers via the one or more communication or network interfaces 604 and one or more communication networks, such as the Internet, other wide area networks, local area networks, metropolitan area networks, and so on;
- a network interface 108;
- a multimedia events database 110;
- a search module 614; and
- an optional query server interface 616.

As described above, the network interface 108 facilitates communication between the server 106 and the communication network 104 and allows for the transfer of information from the server 106 to the communication network 104 to be displayed on a client application 112 of a client 102. The multimedia events database 110 stores information associated with multimedia events. The server 106 may also comprise a search module 614 for conducting searches of the multimedia events database 110.

In some embodiments, memory 606 includes a query server interface 616. The query server interface 616 receives queries from another server, such as a query server, and returns search results to that other server. For instance, a query server may direct a search query from a user to multiple databases, including the multimedia events database 110, and then send search results from one or more of those databases to the user.

Each of the above identified computer software elements in FIGS. 5 and 6 may be stored in one or more of the previously mentioned memory devices, and corresponds to a set of instructions for performing a function described above. The above-identified modules or programs (i.e., sets of instructions) need not be implemented as separate software programs, procedures or modules, and thus various subsets of these modules may be combined or otherwise rearranged in various embodiments. In some embodiments, memory 506 and 606 may store a subset of the modules and data structures identified herein. Furthermore memory 506 and 606 may store additional modules and data structures not described herein.

Although FIGS. 5 and 6 show, respectively, a client 102 and a server 106, the figures are intended more as functional descriptions of the various features which may be present in a client and set of servers than as a structural schematic of the embodiments therein. In practice, and as recognized by those of ordinary skill in the art, items shown separately could be combined and come items could be separated. For example, some items shown separately in FIG. 6 could be implemented on a single server and single items could be implemented by one or more servers. The actual number of server used to implement a server 106 and how features are allocated among them will vary from one implementation to another, and may depend in part on the amount of data traffic that the system must handle during peak usage periods as well as during average usage periods.

Figure 7:
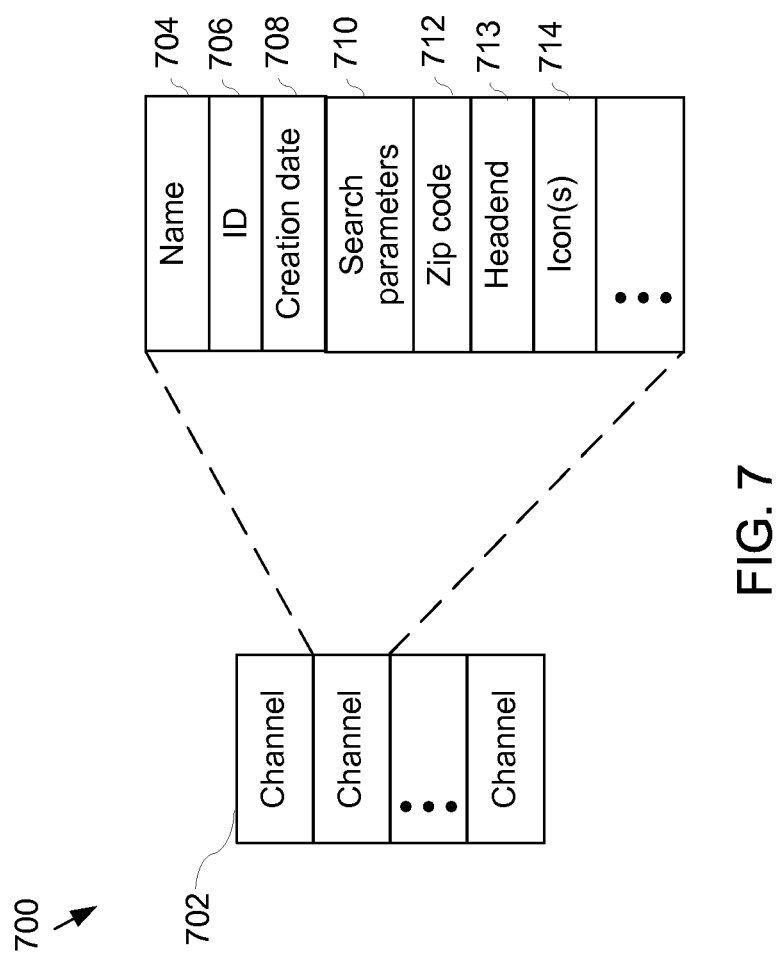
FIG. 7 is a block diagram of a database structure for storing information on virtual channels, according to certain embodiments of the invention.

FIG. 7 is a block diagram of a database structure 700 for storing information on virtual channels, according to certain embodiments of the invention. In some embodiments, database structure 700 applies to the multimedia events database 110 of the server 106. However, in some other embodiments, database structure 700 may also apply to the local database 520 of a respective client 102. One or more functions associated with managing and/or displaying multimedia events information may be called upon to acquire information from database structure 700. Database structure 700 includes storage of information for channel(s) 702. Channel 702 may include information for a given virtual channel such as name 704 of the virtual channel, ID 706, creation date 708, the search parameters 710 that produced search results of multimedia events for creating the virtual channel, zip code 712, headend 713 and icon 714. Zip code 712 is the zip code previously specified by the user. Headend 713 is the headend previously specified by the user. As described with reference to FIG. 2 and FIG. 3A, the user can specify a zip code before the user enters search parameters 710 that produce search results of multimedia events for creating a given virtual channel. Icon information 714 may be associated with a given virtual channel as described herein with reference to icon 376 of FIG. 3E. Each of these types of information may be accessed by the server 106 for sending to a client 102 in response to a client request for information of that type.

Figure 8:
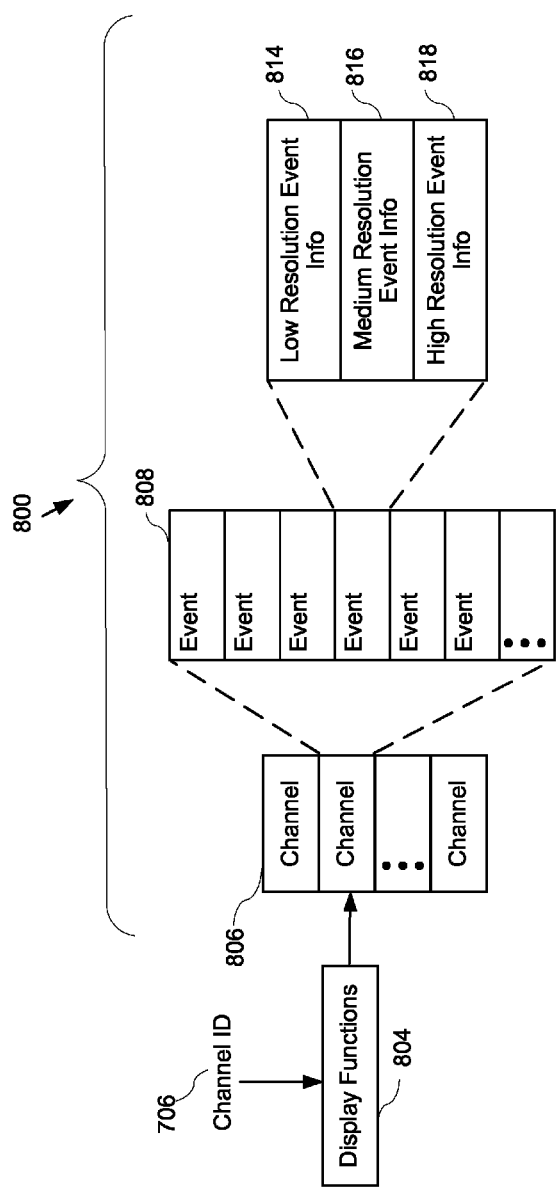
FIG. 8 is a block diagram of a database structure, according to certain embodiments of the invention.

FIG. 8 is a block diagram of a database structure 800 according to certain embodiments of the present invention. As a non-limiting example, database structure 800 may be used in either the server 106, or a respective client 102, or both. In one embodiment, multimedia events database 110 or local database 520 contains a set of virtual channel records 806. The data representing a virtual channel may be found in the database by the use of one or more display functions 804. For example, a respective display function may display a virtual channel by mapping channel identifier 706 to a channel record 806 in the database. A respective channel record comprises information on a set of multimedia events 808. A respective multimedia event in the set of multimedia events has corresponding low resolution event information 814, medium resolution event information 816, and high resolution event information 818, according to certain embodiments of the invention. As previously described, an example of low resolution information is the low resolution data associated with broadcast schedule 308 of FIG. 3A, which can include channel names and the number of shows or episodes for a given time of broadcast. An example of medium resolution information is the additional information (e.g., show or episode name) on the multimedia events that can be obtained by hovering the user's cursor over the time slot on broadcast schedule 308 as shown in FIG. 3A. An example of high resolution information is illustrated by FIG. 3D that shows detailed information associated with high resolution data in an iframe 326 when the user selects the link 342b (shown in FIG. 3C) associated with the particular multimedia event. While some events in the database may have all three sets of information, it is possible that other events in the database will be devoid of high resolution information 818, or even medium resolution information 816. The fetching and pre-fetching of low, medium and high resolution information is discussed in co-pending U.S. patent application Ser. No. 11/618,640, filed Dec. 29, 2006, "System and Method for Displaying Multimedia Events Scheduling Information," which is hereby incorporated by reference.

In the foregoing specification, embodiments of the invention have been described with reference to numerous specific details that may vary from implementation to implementation.

We claim:

1. A computer-implemented method, comprising:
   on a client system having one or more processors and memory storing one or more programs, the one or more processors executing the one or more programs to perform the operations of:
   responsive to at least one constraint associated with a search query,
   obtaining a plurality of time-bounded multimedia events based on relevance to the search query, wherein a respective time-bounded multimedia event in the plurality of time-bounded multimedia events is associated with a respective broadcasting time;
   presenting a first set of objects along a first axis of a relevance bar and concurrently displaying a grid containing at least a subset of a plurality of search results for the search query, wherein
      (i) each object in the first set of objects corresponds to one or more time-bounded multimedia events in the plurality of time-bounded multimedia events,
      (ii) the first axis represents a unit of time,
      (iii) the first set of objects is presented, at respective locations along the first axis of the relevance bar, in accordance with respective broadcasting times of the time-bounded multimedia events, and
      (iv) the first set of objects is presented with respective visual indicia indicating a varying degree of relevance between content of a respective time-bounded multimedia event and the search query
   stacking multiple objects corresponding to the first set of multimedia events along a second axis perpendicular to the first axis and at the particular location along the first axis, wherein the particular location corresponds to a particular time, thereby indicating a quantity of multimedia events in the first set of multimedia events having a scheduled time of broadcast during the particular time; and in response to user selection of an object on the relevance bar, preparing for presentation a window on the relevance bar, the window containing information about the multimedia event corresponding to the selected object.

2. The computer-implemented method of claim 1, wherein a multimedia event in the plurality of time-bounded multimedia events is one of: TV content, radio content, video content, movie content, multimedia content, Metadata Site Summary feed content, Multimedia Messaging Service content, games, or music.

3. The computer-implemented method of claim 1, further comprising:
including a slider along the first axis of the relevance bar for moving to a new portion of the relevance bar.

4. The computer-implemented method of claim 1, wherein the relevance bar is displayed parallel to and offset from an edge of the grid.

5. The computer-implemented method of claim 1, further including presenting a second set of objects along the first axis of the relevance bar, wherein each of the objects in the second set of objects is presented at a location along the first axis corresponding to a particular time associated with the object, the second set of objects corresponding to a subset of multimedia events in the search results.

6. The computer-implemented method of claim 1, wherein the at least one constraint associated with the search query is a specified headend, a zip code, or a time period.

7. A method, comprising:
on a server system having one or more processors and memory storing one or more programs, the one or more processors executing the one or more programs to perform the operations of:
responsive to a user-submitted search query:
obtaining a plurality of time-bounded multimedia events based on relevance to the search query, wherein a respective time-bounded multimedia event in the plurality of time-bounded multimedia events is associated with a respective broadcasting time;
preparing for presentation, a first set of objects along a first axis of a relevance bar and a grid containing at least a subset of a plurality of search results for the search query, wherein
(i) each object in the first set of objects corresponds to one or more multimedia events in the search results,
(ii) the first axis represents a unit of time,
(iii) the first set of objects is presented, at respective locations along the first axis of the relevance bar, in accordance with respective broadcasting times of the time-bounded multimedia events, and
(iv) the first set of objects is presented with respective visual indicia indicating a varying degree of relevance between content of a respective time-bounded multimedia event and the search query;
causing multiple objects corresponding to the plurality of multimedia events to be stacked along a second axis perpendicular to the first axis and at the particular location along the first axis, wherein the particular location corresponds to a particular time, thereby indicating a quantity of multimedia events in the plurality of multimedia events having a scheduled time of broadcast during the particular time; and in response to user selection of an object on the relevance bar, preparing for presentation a window on the relevance bar, the window containing information about the multimedia event corresponding to the selected object.

8. The method of claim 7, wherein the at least one constraint is a geographic location identifier of the user.

9. The method of claim 7, wherein the at least one constraint is at least one selected headend.

10. The method of claim 7, including responding to user selection of a portion of the relevance bar by sending to the client additional search results corresponding to the user selected portion of the relevance bar.

11. The method of claim 7, wherein the at least one constraint associated with the search query is a zip code or a time period.

12. A non-transitory computer readable storage medium storing one or more programs for execution by one or more processors in a computer system, the one or more programs comprising instructions for:
responsive to at least one constraint associated with a search query,
obtaining a plurality of time-bounded multimedia events based on relevance to the search query, wherein a respective time-bounded multimedia event in the plurality of time-bounded multimedia events is associated with a respective broadcasting time;
presenting a first set of objects along a first axis of a relevance bar and a grid containing at least a subset of a plurality of search results for the search query, wherein
(i) each object in the first set of objects corresponds to one or more time-bounded multimedia events in the plurality of time-bounded multimedia events,
(ii) the first axis represents a unit of time,
(iii) the first set of objects is presented, at respective locations along the first axis of the relevance bar, in accordance with the respective broadcasting time of the time-bounded multimedia events; and
(iv) the first set of objects is presented with respective visual indicia indicating a varying degree of relevance between content of a respective time-bounded multimedia event and the search query;
stacking multiple objects corresponding to the first set of multimedia events along a second axis perpendicular to the first axis and at the particular location along the first axis, wherein the particular location corresponds to a particular time, thereby indicating a quantity of multimedia events in the first set of multimedia events having a scheduled time of broadcast during the particular time; and
in response to user selection of an object in the display bar, presenting a window on the display bar, the window containing information about the multimedia event corresponding to the selected object.

13. The non-transitory computer readable storage medium of claim 12, wherein the at least one constraint associated with the search query is a specified headend, a zip code, or a time period.

14. A client system, comprising:
one or more processors;
memory coupled to the one or more processors;
one or more programs stored in the memory and executable by the one or more processors, the one or more programs including instructions for:
responsive to at least one constraint associated with a search query, obtaining a plurality of time-bounded multimedia events based on relevance to the search query, wherein a respective time-bounded multimedia event in the plurality of time-bounded multimedia events is associated with a respective broadcasting time;

presenting a first set of objects along a first axis of a relevance bar and a grid containing at least a subset of a plurality of search results for the search query, wherein (i) each object in the first set of objects corresponds to one or more time-bounded multimedia events in the plurality of time-bounded multimedia events, (ii) the first axis represents a unit of time, (iii) the first set of objects is presented, at respective locations along the first axis of the relevance bar, in accordance with the respective broadcasting time of the time-bounded multimedia events, and (iv) the first set of objects is presented with respective visual indicia indicating a varying degree of relevance between content of a respective time-bounded multimedia event and the search query;

stacking multiple objects corresponding to the first set of multimedia events along a second axis perpendicular to the first axis and at the particular location along the first axis, wherein the particular location corresponds to a particular time, thereby indicating a quantity of multimedia events in the first set of multimedia events having a scheduled time of broadcast during the particular time; and in response to user selection of an object on the relevance bar, presenting a window on the relevance bar, the window containing information about the multimedia event corresponding to the selected object.

15. The client system of claim 14, wherein the at least one constraint associated with the search query is a specified headend, a zip code, or a time period.

16. The client system of claim 12, wherein a multimedia event in the plurality of time-bounded multimedia events is one of: TV content, radio content, video content, movie content, multimedia content, Metadata Site Summary feed content, Multimedia Messaging Service content, games, or music.

17. The client system of claim 12, the one or more programs further including instructions for:

presenting a slider along the first axis of the relevance bar for moving to a new portion of the relevance bar, and receiving respective portions of the search results corresponding to the new portion.

18. The client system of claim 12, wherein the display bar is displayed parallel to and offset from an edge of the grid.

19. A server system, comprising:
one or more processors;
memory coupled to the one or more processors;
one or more programs stored in the memory and executable by the one or more processors, the one or more programs including instructions for:
responsive to a user-submitted search query:

obtaining a plurality of time-bounded multimedia events based on relevance to the search query, wherein a respective time-bounded multimedia event in the plurality of time-bounded multimedia events is associated with a respective broadcasting time;

preparing for presentation, a first set of objects, along a first axis of a relevance bar and a grid containing at least a subset of a plurality of search results for the search query, wherein (i) each object in the first set of objects corresponds to one or more multimedia events in the search results, (ii) the first axis represents a unit of time, (iii) the first set of objects is presented, at respective locations along the first axis of the relevance bar, in accordance with respective broadcasting times of the time-bounded multimedia events, and (iv) the first set of objects is presented with respective visual indicia indicating a varying degree of relevance between content of a respective time-bounded multimedia event and the search query;

causing multiple objects corresponding to the plurality of multimedia events to be stacked along a second axis perpendicular to the first axis and at the particular location along the first axis, wherein the particular location corresponds to a particular time, thereby indicating a quantity of multimedia events in the plurality of multimedia events having a scheduled time of broadcast during the particular time; and in response to user selection of an object on the relevance bar, preparing for presentation a window on the relevance bar, the window containing information about the multimedia event corresponding to the selected object.

20. The server system of claim 19, wherein a multimedia event in the set of time-bounded multimedia events is one of: TV content, radio content, video content, movie content, multimedia content, Metadata Site Summary feed content, Multimedia Messaging Service content, games, or music.

21. The server system of claim 19 wherein the at least one constraint is a geographic location identifier of the user.

22. The server system of claim 19 wherein the at least one constraint is at least one selected headend.

23. The server system of claim 19, the one or more program further including instructions for responding to user selection of a portion of the relevance bar by preparing for presentation additional search results corresponding to the user selected portion of the relevance bar.

24. The server system of claim 19, wherein the at least one constraint associated with the search query is a specified headend, a zip code, or a time period.

* * * * *